Patented Sept. 18, 1951

2,567,980

UNITED STATES PATENT OFFICE 2,567,980

DRYING WET WHEAT GLUTEN

Justin M. Tuomy, Madison, Wis., and Richard L. Slotter, Minneapolis, Minn., assignors to the United States of America as represented by the Secretary of Agriculture No Drawing. Application January 25, 1949, Serial No. 72,736

8 Claims. (Cl. 34—34)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the preparation of undevitalized or undenatured wheat gluten, and has among its objects the provision of a process which eliminates costly hand labor, excessive drying times, and at the same time is capable of producing wheat gluten equal or superior to the commercial gum glutens heretofore available. Other objects will be apparent from the description of the invention.

Undevitalized wheat gluten finds utility as an ingredient in food preparations, especially in the fortification of flours poor in protein. It also finds important use in diabetic preparations. According to the prior art, wheat gluten, such as is produced by the Martin, batter or other processes, is in the form of a dough-like mass containing about 65 to 70 percent moisture. In preparing the gluten for use, pieces of this dough-like mass are placed like biscuits on large trays, the trays put in a drying oven and the gluten dried under vacuum. Also, it has been suggested to dry small pellets of wet gluten under atmospheric conditions.

The prior methods require an excess of drying time, hand labor, and very careful control of drying temperatures in order to produce satisfactory dry glutens.

According to the invention, wet wheat gluten as produced by the Martin, batter, or other process, and containing about from 65 to 70 percent moisture is dispersed in ethanol to a slurry-like dispersion and dried on a conventional drum drier.

The invention accomplishes the production of a dry, fluffy gluten having extremely high acetic acid solubility in a very short time and at a very low processing cost. The alcohol may be recovered almost quantitatively from the process, the handling losses amounting to 1 percent or less.

Prior workers have reported that gliadin becomes irreversibly altered after standing for some time in contact with 75 to 85 percent ethanol. Under some conditions, even 70 percent ethanol will denature gliadin. Also, weak alcohol, 20 and 30 volume percent, denatures gliadin at low temperatures.

In the present invention, concentrations of alcohol are used in the range of 55 to 80 percent by volume. We have discovered that dispersions of wheat gluten in alcohol within these ranges and under the conditions of our process become denatured very slowly and for periods up to thirty minutes, there is no critical loss in acetic acid solubility of the gluten. We have further discovered that wet wheat gluten when mixed with ethanol of the above concentration results in a non-filterable and complete dispersion. This dispersion is slurry-like and may be spread upon rolls of a drum drier, dried and the product recovered as sheets or flakes. During the formation of the slurry the gluten goes through a gel stage which shortly breaks down to give the fluid. The slurry is formed usually by stirring, and there is a rather sharp break point of this gel which can be determined when the stirring device suddenly speeds up.

We have conducted tests which show that methanol, isopropanol, and acetone may be substituted for ethanol in our process. However, ethanol is more advantageous with respect to the handling properties of the dispersion, cost, and likelihood of contamination of the gluten from a toxic standpoint.

Our process is carried out in the following manner.

Wheat gluten, containing about 66 percent moisture, is agitated with absolute ethanol or 190 proof ethanol in an amount sufficient to make about 55 to 80 percent ethanol by volume. These concentrations of ethanol are used for the sake of convenience. Lower concentrations may be used with satisfactory results so long as the resulting slurry has the required alcohol content of 55 to 80 per cent by volume. The preferred concentration range is 60 to 70 percent by volume. The mixture is agitated mechanically for a short period. After a minute or two, the slurry is formed and is then transferred either continuously or batchwise, to a drum drier. It is spread upon the rolls of the drum drier and the drier is operated at a roll speed corresponding to a drying time of about two to ten seconds.

Depending upon the setting of the rolls, the dried gluten is either in the form of thin sheets or flakes. For thin sheets the rolls are set as close together as possible (for example, about 0.0015). Settings of the order of 0.004 to 0.014 give flakes of a light and fluffy consistency. The dispersions are allowed to flow to the drums, heated with steam at a pressure of 40 to 80 p. s. i. gage, corresponding roughly to about 140° C. to 160° C. The preferred temperature is about 60 pounds steam pressure, corresponding roughly to about 155° C. As the rolls rotate, the film of dry gluten is scraped from the roll.

The moisture content of the dried gluten usually varies between 3 and 5 percent. It grinds easily in a hammer mill. A rough approximation of the specific weight of the product indicates a range of about 17 to 20 pounds per cubic foot. Commercial ground gluten averages a much greater specific weight, usually more than twice that of the drum dried gluten.

Baking tests on the gluten dried in accordance with our invention shows it to be about equal to commercial gum glutens, both when made up with starch as an artificial flour and when used to increase the protein content of a low protein flour.

The fine powder can be reconstituted readily into a dough by the addition of water. It has an acetic acid solubility of approximately 8 per cent, whereas commercial gum glutens have acetic acid solubilities of from 76 to 79 percent. When mixed with flour, the dry gluten gives a marked increase in bread loaf volume.

The following specific examples further illustrate the invention, but are not to be considered limiting.

Example 1

Eight dispersions were prepared by mixing 100 g. samples of wet wheat gluten (containing approximately 66 percent moisture) with 125 cc. of absolute ethanol in a Waring blender for approximately one minute.

For drying the gluten dispersions, a Bufflovak vacuum drum drier was equipped with a one thousand cc. glass reservoir. The rolls were fed by means of a T fitting leading from the reservoir to directly above the rolls. The feed pipe was surrounded by a water cooling jacket. The drier was operated under atmospheric pressure, the vacuum being used merely to pull off the solvent vapors. The drier was operated at a roll speed corresponding to a drying time of 3.2 seconds. The rolls were heated by steam at a pressure of 40 to 80 p. s. i. gage.

The roll distance was varied between 0.004 and 0.014 inch. The product appeared very similar to the original gluten. Physical test indicated that it was soft and had the spring of the original gluten. It could be mixed with starch and then washed out again by either the Martin or batter process in the same way that the original gluten was prepared. The acetic acid solubility varied from 82.6 to 86.1.

Example 2

Excess water was wrung out of wet wheat gluten by hand, giving a wet product of about 66 or 67 percent moisture. The gluten was slurried with ethanol as in Example 1 and fed directly to the drum drier rolls. One hundred twenty-five cc. of absolute ethanol per 100 g. of wet gluten was used to make up the slurry. The rolls were heated by steam at 80 p. s. i. gage. The rolls were set at 0.008 and 0.012 inch, respectively, in two consecutive runs. In the first run, the product contained 4.20 percent moisture and had an acetic acid solubility of 80.3. In the second run, the product contained 4.06 percent moisture and its acetic acid solubility was 81.1.

Example 3

Two separate continuous runs were made using the Bufflovak drum drier employed in Examples 1 and 2. The ratio of wet gluten to ethanol (95 percent) was 100 g. per 118 cc., respectively. The wet gluten contained about 66 percent moisture. The roll distance was set at 0.01 inch, and the rolls were heated by steam at a pressure of 40 pounds p. s. i. gage. A total of 6,950 g. of wet gluten was dried in the two runs. The dried product was ground in a hammer mill, spread on trays and exposed to the air for several days. It analyzed 83.0 percent protein (dry basis) and had an acetic acid solubility of 81.2 percent.

The dried gluten produced in this experiment was employed in baking tests to supplement the protein of a low protein wheat flour. A flour-gluten blend was employed in which the total protein content was maintained at 13.5 percent at a moisture level of 13.5 percent. The flour before blending contained 11.0 percent protein at the same moisture level. The results compared satisfactorily with those in which commercial gluten was employed. The gluten dried according to the process of this invention had the additional advantageous property of increasing the loaf volume by about 10 percent.

Example 4

The procedure of Example 2 was repeated, but methanol was used in the place of ethanol as the slurry medium. The proportion of 125 cc. methanol per 100 g. of wet gluten was used. The roll distance was set at 0.01 inch. The rolls were heated by steam at 60 p. s. i. gage, which corresponds roughly to about 155° C. The dried product had a moisture content of 4.7 percent and an acetic acid solubility of 82.2 percent.

The gluten came off the rolls wetter than in the case when ethanol was used under similar conditions, and the dry gluten was not as fluffy. Physical tests of the gluten indicated very little difference from the gluten obtained using ethanol.

The use of methanol, as does isopropanol and acetone, results in satisfactory dried gluten by the process of this invention. The procedure for either is the same as that for ethanol with the possible difference that a slightly more rigid control of the temperature, pressure, and other operating conditions are necessary compared with the use of ethanol.

We claim:

1. Process which comprises mixing wet wheat gluten having a moisture content of between 65 and 70 percent with ethanol in the ratio of about 100 g. of wet gluten to 118 cc. of about 95 percent ethanol agitating the mixture until a homogeneous slurry is obtained, spreading the slurry in a thin layer upon a surface heated to a temperature within the range of 150° to 170° C., allowing the slurry to dry by contact with the heated surface and removing the dried gluten from the heated surface, the drying time on the heated surface being no more than about ten seconds.

2. A process of preparing an undenatured wheat gluten which is readily reconstitutable into a dough by addition of water, and which has an acetic acid solubility of not lower than about 82 percent, comprising: mixing wheat gluten containing from about 65 to 70 percent moisture with ethanol in an amount and concentration to make about 55 to 80 percent ethanol by volume, agitating for a short period to form a slurry, and spreading the slurry upon a heated surface in a thin film to quickly dry the gluten, the drying time on the heated surface being no more than about ten seconds.

3. Process whereby undenatured dry, fluffy, wheat gluten having relatively high acetic acid solubility and suitable as an ingredient in food preparations is obtained, which comprises: mixing wet wheat gluten containing from 65 to 70 percent moisture with a dispersant selected from the group consisting of methanol, ethanol, isopropanol and acetone to form a gluten gel in an amount to make about 55 to 80 percent dispersant by volume, agitating the gel whereby the gel is broken down and continuing said agitation until a fluid slurry is formed, drying the slurry by disposing it in the form of a thin film over a heated surface, and removing the dried gluten from the heated surface, the drying time on the heated surface being not more than about ten seconds.

4. The process of claim 3 in which the dispersant is absolute ethanol.

5. The process of claim 3 in which the dispersant is methanol.

6. The process of claim 3 in which the heated surface is at about 150° to 170° C.

7. The process of claim 3 in which the heated surface is at about 150° to 170° C. and the dispersant is ethanol.

8. The process of claim 3 in which the heated surface comprises drier rolls set not more than about 0.014 inch apart.

JUSTIN M. TUOMY.
RICHARD L. SLOTTER.

REFERENCES CITED

The following references are of record in the file of this patent:

UNITED STATES PATENTS

| Number | Name | Date |
|---|---|---|
| 741,436 | Atwood | Oct. 13, 1903 |
| 2,138,049 | Vesce | Nov. 29, 1938 |
| 2,200,391 | Freeman | May 14, 1940 |
| 2,221,806 | Loomis | Nov. 19, 1940 |
| 2,244,680 | Engstrom et al. | June 10, 1941 |
| 2,278,670 | Rauer | Apr. 7, 1942 |

FOREIGN PATENTS

| Number | Country | Date |
|---|---|---|
| 359,641 | Great Britain | Oct. 29, 1931 |

OTHER REFERENCES

"Gel-Forming Derivative of Wheat Gluten," Industrial and Engineering Chemistry, by Reitz et al., Dec. 1944, pages 1149 to 1151.